(12) United States Patent
Bernhardsson et al.

(10) Patent No.: US 9,503,500 B2
(45) Date of Patent: Nov. 22, 2016

(54) SYSTEMS AND METHODS OF CLASSIFYING CONTENT ITEMS

(71) Applicant: Spotify AB, New York, NY (US)

(72) Inventors: Erik Bernhardsson, New York, NY (US); Kevin Faaborg, New York, NY (US); Yinghao Li, New York, NY (US)

(73) Assignee: SPOTIFY AB, Stockholm (SE)

( * ) Notice: Subject to any disclaimer, the term of this patent is extended or adjusted under 35 U.S.C. 154(b) by 464 days.

(21) Appl. No.: 13/911,006

(22) Filed: Jun. 5, 2013

(65) Prior Publication Data

US 2013/0332532 A1   Dec. 12, 2013

Related U.S. Application Data

(60) Provisional application No. 61/657,637, filed on Jun. 8, 2012.

(51) Int. Cl.

| | |
|---|---|
| *G06F 15/16* | (2006.01) |
| *H04L 29/08* | (2006.01) |
| *H04L 29/06* | (2006.01) |
| *H04L 12/58* | (2006.01) |
| *G06F 17/30* | (2006.01) |

(Continued)

(52) U.S. Cl.
CPC .......... *H04L 67/02* (2013.01); *G06F 17/30038* (2013.01); *G06F 17/30752* (2013.01); *G06F 17/30772* (2013.01); *G11B 27/105* (2013.01); *G11B 27/11* (2013.01); *H04L 51/32* (2013.01); *H04L 65/4084* (2013.01); *H04L 65/60* (2013.01); *H04L 65/605* (2013.01)

(58) Field of Classification Search
CPC ... H04L 67/02; H04L 65/60; H04L 65/4084; H04L 65/605; G06F 17/30038; G06F 17/30752

USPC .......................................................... 709/219
See application file for complete search history.

(56) References Cited

U.S. PATENT DOCUMENTS

2006/0143236 A1 * 6/2006 Wu .................. G06F 17/30053
2007/0208990 A1   9/2007 Kim et al.
(Continued)

OTHER PUBLICATIONS

Spotify AB, International Preliminary Report on Patentability, PCT/US2013/044588, Dec. 9, 2014, 6 pgs.
(Continued)

*Primary Examiner* — Kristie Shingles
(74) *Attorney, Agent, or Firm* — Morgan, Lewis & Bockius LLP

(57) ABSTRACT

A method of classifying content items utilizes user-generated playlists. A content item is included in respective playlists from a plurality of respective distinct users. The method receives respective user-generated information corresponding to the content item from each of the respective distinct users. For some users, the respective user-generated information is the respective playlist title. For other users, the user-generated information is the text of social network posting that identifies a respective playlist. In each case, the respective user-generated information specifies a first content item attribute that characterizes the content item. Accordingly, the method assigns the first content item attribute to the content item. Subsequently, a request is received from a first user for a content item having the first content item attribute. In response, the method selects the content item according to the first content item attribute and delivers the first content item to the first user.

24 Claims, 9 Drawing Sheets

(51) Int. Cl.
*G11B 27/10* (2006.01)
*G11B 27/11* (2006.01)

(56) References Cited

U.S. PATENT DOCUMENTS

| | | | |
|---|---|---|---|
| 2008/0133593 A1 | 6/2008 | Clark | |
| 2009/0047000 A1* | 2/2009 | Walikis | G06F 17/30053 386/238 |
| 2009/0113301 A1* | 4/2009 | Fisher | G06F 8/61 715/716 |
| 2009/0150797 A1* | 6/2009 | Burkholder | G06F 17/30056 715/747 |
| 2010/0325137 A1 | 12/2010 | Paez | |
| 2011/0222784 A1* | 9/2011 | Rowe | G06F 3/04886 382/218 |
| 2012/0221687 A1* | 8/2012 | Hunter | G06F 17/30029 709/219 |
| 2012/0331168 A1* | 12/2012 | Chen | H04L 67/1097 709/231 |

OTHER PUBLICATIONS

Chen, Improving music genre classification using collaborative tagging data, WSDM'09, Barcelona, Spain, Feb. 9-12, 2009, 10 pgs.
Nanopoulos, Know Thy Neighbor: Combining Audio Features and Social Tags for Effective Music Similarity, ICASSP 2011, May 22, 2011, pp. 165-168.
Spotify AB, International Search Report and Written Opinion, PCT/US2013/044588, Aug. 30, 2013, 9 pgs.

\* cited by examiner

SYSTEMS AND METHODS OF CLASSIFYING CONTENT ITEMS

RELATED APPLICATIONS

This application claims priority to U.S. Provisional Application Ser. No. 61/657,637, filed Jun. 8, 2012, entitled "Playlist Generation and Analysis," which is incorporated by reference herein in its entirety.

TECHNICAL FIELD

The disclosed implementations relate generally to classifying content items, and more specifically to classifying content items based on user-generated information.

BACKGROUND

Historically, there have been two main ways to receive audio tracks. If a user purchases a physical medium that stores the audio tracks, then the user has complete control over what tracks to play and when to play them. However, a physical medium (such as a CD) has a fixed set of audio tracks, such as a specific "album" from a single artist. With more work, a user can "burn" additional physical media that have customized sequences of audio tracks. However, even with that work, the list is still fixed.

An alternative is to listen to audio tracks on a radio station. A radio station has a very large selection of audio tracks and can play those tracks in an endless variety of sequences. In addition, different radio stations can focus on different genres, enabling users to select the specific type of music desired (which can vary from day to day or from hour to hour). However, radio stations have a different set of problems. One problem is the abundance of commercials and other interruptions. A second problem is that the selected audio tracks may not be of interest to the listener. In fact, a user may strongly dislike some of the audio tracks that are played. A user can address these problems to some extent by switching the station or channel. However, the need to switch among multiple stations or channels may indicate that there is no station or channel that is a good match for a specific user's interests.

Some companies have addressed these problems by providing streaming content over the Internet. In some instances, a user searches for desired content items (e.g., audio tracks), and the desired content items are subsequently streamed to the user over a computer. Some websites provide Internet radio stations, which can be designated for a single individual or group of individuals. The Internet radio stations stream an endless sequence of content items, commonly without commercials. In addition, if a user does not want the current content item, the user can execute a "skip-forward," which prompts the Internet radio station to select and stream a new content item.

Despite the appeal of an Internet radio station as described, there are still problems. One problem is how to select content items that best represent what a user wants. This is particularly difficult when the Internet radio station has little information about a user's preferences. Furthermore, some users are reluctant to spend their time giving extensive information about their preferences.

In addition, many users like to listen to a radio station with a specific genre. Historically, a DJ or other individual would select content items corresponding to an identified "genre". However, different individuals may have different opinions, and some of those opinions may not correspond to what people expect. Also, even if there is common knowledge about the classification of some content items, it may not be possible to identify that common knowledge. As with person preferences, users are typically reluctant to spend their time providing explicit feedback.

SUMMARY

Some implementations of the present invention address these and other problems. Some implementation offer a streaming music service based on search, play, and playlists. For instance, a user can type the name of an artist or track and search for it to find it. The user can then click the found track to play it. The user can repeat this process, finding and playing new tracks they recall.

Some implementations provide for the creation of playlists. Instead of playing an individual track right now, a user can include it in a playlist (e.g., by dragging it into a playlist in a user interface). This allows users to organize tracks, and play them later. Users frequently create multiple playlists, and can give each playlist a text name. Users create playlists to group together music that holds some common meaning to them.

Some implementations offer an online radio feature. This radio feature plays an endless sequence of songs. The user does not know which song will play next. If the user doesn't like the song currently playing, a "Skip" or "Skip Forward" button moves to the next song immediately. To create a new radio station, a user first identifies a "seed." This seed can be one or more individual tracks, one or more artists, one or more albums, one or more playlists, a music genre, or combinations of these. A software system "programs" the radio station, choosing which tracks to play dynamically. In some implementations, an Internet radio station is associated with a single user or user ID. In some implementations, Internet radio stations can be shared with other users. In some implementations, the selection criteria for an Internet radio station are based on input from two or more users.

The techniques described above with respect to audio tracks can also be applied more generally to other content items, such as video, animations, and even some online games.

The success of an Internet radio station can be measured based on a number of quantitative factors, such as:
  How often a user returns to the radio station;
  How long a user listens to the radio station;
  How many tracks a user listens versus the number of tracks that are skipped; and
  How many tracks a user "likes" or "dislikes" (e.g., by clicking on a button, hyperlink, icon, etc.)

Some of the disclosed implementations analyze the data from a "search and play" music service (e.g., where users select individual tracks, albums, or artists to listen to), as well as data relating to usage of the radio stations in order to program radio stations. One goal of these ideas is to reduce the number of times the user skips tracks, thus indicating that the selection algorithm for a particular radio station is selecting tracks that the user wants to hear.

Some implementations use one or more of the following techniques:
  Large scale similarity search: using LSH (Locality sensitive hashing) to do similarity search, combined with matrix factorization;
  Using skip data, track preference data, time-on-radio data, and/or repeat listening data, to enhance the radio quality;

Large scale iterative graph algorithms using Bloom filters to make track selection and optimization faster; and Using user-generated data (e.g., playlist names, social network postings, etc.) to build genre stations.

Some of the disclosed implementations use large scale collaborative filtering. Some implementations apply these algorithms to Internet radio stations. In particular, with millions of available content items, it would be very expensive (in time and resources) to compare each of the content items to all of the other content items. One alternative uses matrix factorization, or singular value decomposition (SVD). The idea is to create a usage matrix whose rows represent users and whose columns represent content items. In some implementations, each entry represents the number of times that a specific user selected a specific content item. It would be useful to express each entry in this matrix as a product of a user vector U and an item vector I. Although this cannot be done exactly, user and item vectors can be chosen so that the vector products approximate the entries in the usage matrix.

Because the usage matrix is sparse, it is fairly easy to iteratively compute user and item vectors. For example, some implementations use about 20 iterations, which can occur in about 24 hours when distributed across many computers operating in parallel. Finding the user and item vectors factors the usage matrix into a product, which is a convenient representation. In some implementations, the user and item vectors contain around 40 elements, so multiplying vectors together is quick.

In some implementations, the user and item vectors are viewed as points in hyperspace (e.g., with 40 dimensions). Using this representation, the proximity between two item vectors is just the inner product (or dot product) of two vectors. Thus, the similarity between two content items has been reduced to a straightforward calculation.

Unfortunately, with roughly 5 million audio tracks, there are about 25 trillion possible products. Some implementations address this problem by "cutting" the 40 dimensional vector space of items with random hyperplanes, creating a number of faceted regions. Additional hyperplanes are added until there are few enough points in each region so that it is possible to compare all the item vectors in each region with all the other item vectors in that region. Some implementations add hyperplanes until there are only a few hundred item vectors in each region. Depending on computing resources, the desired number of item vectors in each faceted region may be more or less than a few hundred.

In the vector space of item vectors, the vertices are the item vectors themselves, representing content items like audio tracks, and the edges represent relationships. Some pairs of content items are quite close in this vector space. Some implementations "fine tune" the calculation of proximity by assigning weights to each of the edges. For example, one edge may have a weight of 0.9, whereas another edge has a weight of 0.2. Selecting the weights is another optimization problem. This can be completed in about 30 iterations, taking a couple of days when distributed across many computers operating in parallel.

The objective is to assign weights so that a user is presented with content items that the user likes. However, there is a sliding scale of whether to repeat already known items versus introducing new items. At one end of the scale, an Internet radio station could be programmed conservatively, playing only songs that a user has already identified positively and songs that are very likely to be similar to what's already played (and identified positively). At the opposite end of the scale, an Internet radio station can play a greater variety of content items, introducing the listener to related but new tracks. The position on the scale can also depend on an individual user, and thus some implementations track how interested users are in being introduced to more varied new music.

When assigning weights to the edges, some implementations apply Bloom filters. The Bloom filters allow discarding many negatives while allowing some false positives. For example, if user A has never listened to song B, then there is no need to record that fact. Empirically, applying Bloom filters can reduce the amount of overhead by 99%.

There are a number of algorithms, or models, and several post processing steps. Each model can independently answer the question, "How likely is it that user A will play track B next, based on the tracks the user has previously listened to?" For example, suppose there are 30 different models, and they all produce slightly different answers. Some implementations combine the results of the models, which reduces noise. One of the models is a simple classifier that just favors whatever is popular. This model ignores the user, and answers based solely on the popularity of the track. In some implementations, the popularity model is limited to popularity within a demographic group or within a group that have shown interest in the same genre(s). For example, even if a certain classic rock song is very popular, a user who is focused on hip-hop would likely have no interest in that song.

Some implementations provide genre radio stations. For example, instead of starting a radio station based on a given artist or track, there are radio stations based more broadly around a genre of music, like rock or pop. Some implementations build genre radio stations using user playlists. Starting with a desired genre (e.g., hip hop) the system finds a playlist with the genre name in the playlist title. A user might have named a playlist "Mark's Hip Hop Favorites" or "Really good Electronica". In some implementations, there may be a million hip hop playlists. There is some "noise" in the data, but by aggregating the lists of many users, consistent patterns are detected.

In addition to identifying individual content items that are similar, some embodiments identify similarity of artists. For example, if audio tracks by artist A are found similar to the audio tracks of artist B, then it can be inferred that artist A is similar to artist B. Therefore, when a user identifies interest in a specific artist, some implementations recommend other artists of interest. Some implementations compute an artist vector V based on the item vectors I corresponding to the artist (e.g., an average or weighted average). When artists are also represented as vectors, it is possible to make artist to track recommendations as well. For example, given a desired artist, some implementations generate a list of tracks that are similar to the artist (e.g., the top 250 similar tracks). The process of identifying the similar tracks can be distributed across computers, and thus performed in a reasonable amount of time, even though there are millions of available items.

According to some implementations, a method of selecting content items is performed by an electronic device having one or more processors and memory. The memory stores one or more programs for execution by the one or more processors. The method includes providing a first content item to a first user. The first content item is selected from a plurality of available content items, such as audio tracks or videos. The first user provides feedback relating to the first content item, and the feedback is used to adjust content item selection criteria for a second user distinct from the first user. In some implementations, the feedback provided by the first user can be a skip-forward input (i.e., the user chooses to skip to the next content item), an indication of a positive preference for the content item, or an indication of a negative preference for the content item. The method includes receiving a request for a content item from the second user and selecting a content item from the plurality of available content items for the second user according to the adjusted content item selection criteria. The selected content item is then provided to the second user.

Some implementations provide the first content item to a plurality of first users distinct from the second user, and utilize feedback from at least a plurality of those first users to adjust the content item selection criteria for the second user. Regardless of whether the feedback is from a single first user or a plurality of first users, the adjustment of the selection criteria for the second user is based on some correlation (or inverse correlation) between the first user(s) and the second user. For example, if the second user has shown some interest in a specific artist, and the first user has shown an affinity for the same specific artist, then feedback from the first user could be relevant to the second user.

Some implementations expand the described process to include a sequence of content items, using feedback from the first user (or users) regarding the entire sequence. For example, metrics can measure the number of times in the sequence that the first user skipped forward, the amount of time the first user spent listening (or watching) the sequence of content items, the number of times the first user provided positive and/or negative feedback about content items in the sequence, which specific content items the user provided feedback on, or the number of times that the first user returned to the stream (e.g., returned to the same Internet radio station).

According to some implementations, a method of classifying content items utilizes user-generated playlists. A content item is included in respective playlists from a plurality of respective distinct users. The method receives respective user-generated information corresponding to the content item from each of the respective distinct users. For some users, the respective user-generated information is the respective playlist title. For other users, the user-generated information is the text of a social network posting that identifies a respective playlist. In each case, the respective user-generated information specifies a first content item attribute that characterizes the content item. Accordingly, the method assigns the first content item attribute to the content item. Subsequently, a request is received from a first user for a content item having the first content item attribute. In response, the method selects the content item according to the first content item attribute and delivers the first content item to the first user.

A method of selecting content items is provided, in accordance with some implementations. The method may be performed at an electronic device having one or more processors and memory storing one or more programs for execution by the one or more processors. (E.g., content server 106 and/or client device 102.) The method includes providing a first content item to a first user. In some implementations, the first content item is an audio track (e.g., music) or a video. In some implementations, the first content item is one of a plurality of content items selected for delivery to plurality of users, for example, as part of an internet radio station, streaming playlist, etc. In some implementations, the content items of the plurality of content items are selected so as to be similar to a "seed," such as a song, album, artist, or genre. In some implementations, the content items of the plurality of content items are selected based on a determination that they are likely to be enjoyed by a particular user, or a particular type of user.

The method further includes receiving an input relating to the first content item from the first user. In some implementations, the input is a skip forward input. In some implementations, the input relating to the first content item indicates a negative preference for the first content item. In some implementations, the input relating to the first content item indicates a positive preference for the first content item. In some implementations, the absence of a skip forward input is also considered an "input," which is an implicit recognition that the user at least tolerates the content item.

The method further includes adjusting content item selection criteria for the first user and a second user separate from the first user based at least in part on the input. In some implementations, this entails adjusting the selection criteria not only for the user that provided the input (e.g., so that user doesn't hear the "disliked" track again), but also to customize selection algorithms for other users, such as a global selection algorithm for a particular radio station. Accordingly, one user's actions with respect to a content item can be used as feedback into the overall selection criteria, as well as the process of tuning the selection criteria. Some implementations use feedback from one user to modify selection criteria for all radio stations, selecting content items to present to users in a non-radio context, suggesting tracks for a user's playlist, and so on.

Another method is provided for selecting content items in accordance with some implementations. The method is performed at an electronic device having one or more processors and memory storing one or more programs for execution by the one or more processors. The method includes providing a first content item to a first plurality of users; receiving an input relating to the first content item from the first plurality of users; and adjusting content item selection criteria for the first plurality of users and a second plurality of users separate from the first plurality of users based at least in part on the input.

Another method is provided for selecting content items in accordance with some implementations. The method is performed at an electronic device having one or more processors and memory storing one or more programs for execution by the one or more processors. The method includes providing a first content item to a first user, wherein the first content item is one of a plurality of content items selected for delivery to the first user, and wherein the plurality of content items are selected in accordance with first selection criteria; receiving an input from the first user relating to the first content item; and adjusting the first selection criteria and second selection criteria based at least in part on the input, wherein a second plurality of content items are selected for delivery to a second user in accordance with the second selection criteria.

Another method is provided for selecting content items in accordance with some implementations. The method is performed at an electronic device having one or more processors and memory storing one or more programs for execution by the one or more processors. The method includes providing a sequence of content items to a first user (e.g., streaming an internet radio station); determining an amount of time that the sequence of content items is being provided to the first user; and adjusting selection criteria for the sequence of content items based at least in part on the amount of time that the sequence of content items was provided to the first user. In some implementations, the method further includes adjusting second selection criteria for a second sequence of content items based at least in part on the amount of time that the sequence of content items was provided to the first user.

Another method is provided for selecting content items in accordance with some implementations. The method is performed at an electronic device having one or more processors and memory storing one or more programs for execution by the one or more processors. The method includes providing a first sequence of content items to a first user, the first sequence of content items selected in accordance with first selection criteria. In some implementations, the first sequence is an internet radio station. In some implementations, the content items are selected so as to relate to a common theme (e.g., artist, track, album, genre, etc.). The method further includes providing a second sequence of content items to a second user, the second sequence of content items selected in accordance with second selection criteria. The method further includes, for each of the first user and the second user, identifying one or more metrics selected from the group consisting of: a skip forward input; an input indicating a negative preference to a respective content item; an input indicating a positive preference to a respective content item; an amount of time that the respective sequence of content items was provided to the user; and a number of times that a respective user initiates the respective sequence of content items. In some implementations, the method includes using 1, 2, 3, 4, or all of these metrics. The method further includes determining a first score for the first sequence and a second score for the second sequence, the first and the second scores based at least in part on the identified one or more metrics.

Another method is provided for selecting content items in accordance with some implementations. The method is performed at an electronic device having one or more processors and memory storing one or more programs for execution by the one or more processors. The method includes providing a first content item to a user; receiving user-generated information associated with the first content item, the user-generated information having been associated with the first content item by the user; and assigning an attribute to the first content item based on the user-generated information. In some implementations, the user-generated information is from a text of a social network posting associated with the first content item. For example, a user may post to a social network a link to a track, and comment saying "this is the best new hip-hop track!" The words "hip-hop" can be identified in this comment and associated (at the service provider) with the track. As another example, a user could post a link to a playlist on a social network, identifying the playlist as "music for a rainy day." Thus, users' interactions with tracks, artists, albums, etc., can help the service provider to further classify tracks, measure popularity, identify themes or trends, and tune selection algorithms and criteria for internet radio stations.

Another method is provided for selecting content items in accordance with some implementations. The method is performed at an electronic device having one or more processors and memory storing one or more programs for execution by the one or more processors. The method includes identifying a name associated with a user-generated playlist, the playlist comprising a plurality of content items; determining an attribute in the name, the attribute describing an aspect of the plurality of content items; assigning the attribute to at least one of the content items in the plurality of content items; and including the at least one content item in a sequence of content items for delivery to a user, wherein the sequence of content items is characterized at least partially by the attribute.

BRIEF DESCRIPTION OF THE DRAWINGS

Like reference numerals refer to corresponding parts throughout the drawings.

DESCRIPTION OF IMPLEMENTATIONS

Figure 1:
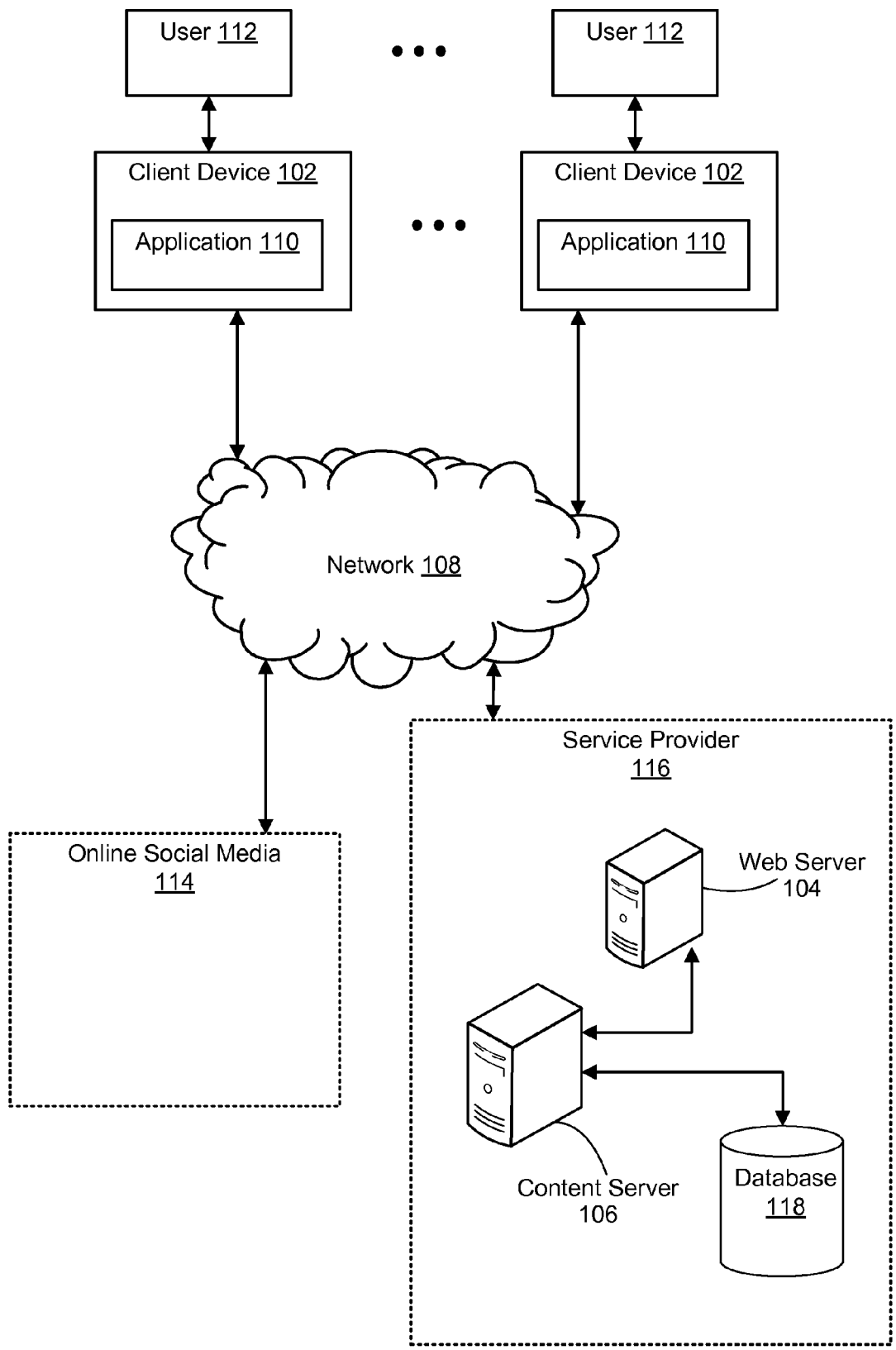
FIG. 1 illustrates the context in which some implementations of the present invention operate.

FIG. 1 illustrates the context in which implementations of the present invention operate. A plurality of users 112 access their client devices 102 to run an application 110, which accesses content items provided by the service provider 116. In some implementations, the application 110 runs within a web browser 224. The application 110 communicates with the service provider 116 over a communication network 108, which may include the Internet, other wide areas networks, one or more local networks, metropolitan networks, or combinations of these. In some implementations, data from online social media 114 is integrated with the disclosed systems and methods. The service provider 116 works with the application 110 to provide users with content items, such as audio tracks or videos. The service provider typically has one or more web servers 104, which receive requests from client devices 102, and provide content items, web pages, or other resources in response to those requests. The service provider also includes one or more content servers 106, which perform the methods described herein, including selecting appropriate content items for users, classifying content items, managing user playlists, and integrating with online social media. The data used by the content servers 106 is typically stored in a database 118, including content items 324 and associated metadata, as described below with respect to FIG. 3. In some implementations, the database 118 is stored at one or more of the content servers 106. In some implementations, the database is a relational SQL database. In other implementations, the data is stored as files in a file system or other non-relational database management system The client device 102 includes an application 110, such as a media player that is capable of receiving and displaying/playing back audio, video, images, and the like. The client device 102 is any device or system that is capable of storing and presenting content items to a user. For example, the client device 102 can be a laptop computer, a desktop computer, tablet computer, mobile phone, television, etc. Moreover, the client device 102 can be part of, or used in conjunction with, another electronic device, such as a settop-box, a television, a digital photo frame, a projector, a smart refrigerator, or a "smart" table.

In some implementations, the client device 102, or an application 110 running on the client device 102, requests web pages or other content from the web server 104. The web server 104, in turn, provides the requested content to the client device 102.

The content items 324 stored in the database 118 include audio tracks, images, videos, etc., which are sent to client devices 102 for access by users 112. For example, in implementations where the application 110 is a media player, the application 110 may request media content items, and the service provider 116 sends the requested media content items to the client device 102.

Figure 2:
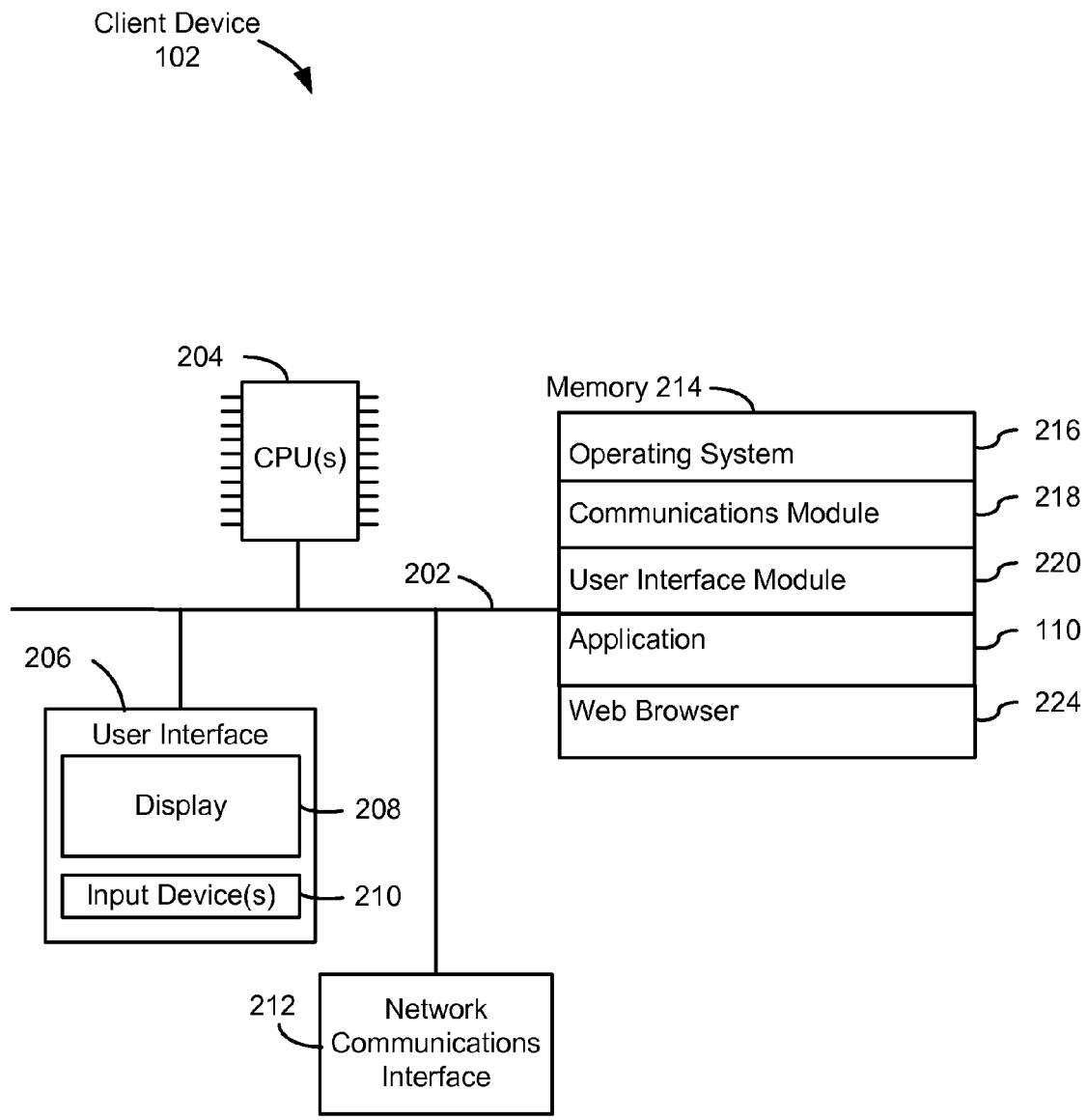
FIG. 2 is a block diagram illustrating a client device in accordance with some implementations.

FIG. 2 is a block diagram illustrating a client device 102 according to some implementations. The client device 102 typically includes one or more processing units (CPUs, sometimes called processors) 204 for executing programs (e.g., programs stored in memory 214), one or more network or other communications interfaces 212, user interface components 206, memory 214, and one or more communication buses 202 for interconnecting these components. The communication buses 202 may include circuitry (sometimes called a chipset) that interconnects and controls communications between system components. In some implementations, the user interface 206 includes a display 208 and input device(s) 210 (e.g., keyboard, mouse, touchscreen, keypads, etc.). In some implementations, the client device 102 is any device or system that is capable of storing and presenting content items to a user. In some implementations, the client device 102 is a mobile device, including, but not limited to, a mobile telephone, audio player, laptop computer, handheld or tablet computer, portable digital assistant, or the like. In some implementations, the client device 102 is any a desktop (i.e., stationary) computer. In some implementations, the client device is, or is incorporated into, a set-top-box, a television, a digital photo frame, a projector, a smart refrigerator, a "smart" table, or a media player accessory.

Memory 214 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 214 optionally includes one or more storage devices remotely located from the CPU(s) 204. Memory 214, or alternately the non-volatile memory devices(s) within memory 214, comprises a non-transitory computer readable storage medium. In some implementations, memory 214 or the computer readable storage medium of memory 214 stores the following programs, modules, and data structures, or a subset thereof:
- an operating system 216, which includes procedures for handling various basic system services and for performing hardware dependent tasks;
- a communications module 218, which connects the client device 102 to other computers (e.g., the web server 104, the content server 106, etc.) via the one or more communication interfaces 212 (wired or wireless) and one or more communication networks 108, such as the Internet, other wide area networks, local area networks, metropolitan area networks, and so on;
- a user interface module 220, which receives commands from the user via the input device(s) 210 and generates user interface objects in the display device 208;
- an application 110 (e.g., a media player, a game, etc.), which provides one or more computer-based functions to a user; and
- a web browser 224, which allows a user to access web pages and other resources over the web. In some implementations, the application 110 runs within the web browser 224.

The application 110 is any program or software that provides one or more computer-based functions to a user. In some implementations, the application is a media player. In some implementations, the application is a computer game. The application 110 may communicate with the web server 104, the content server 106, as well as other computers, servers, and systems.

In some implementations, the programs or modules identified above correspond to sets of instructions for performing a function or method described above. The sets of instructions can be executed by one or more processors (e.g., the CPUs 204). The above identified modules or programs (i.e., sets of instructions) need not be implemented as separate software programs, procedures, or modules, and thus various subsets of these programs or modules may be combined or otherwise re-arranged in various implementations. In some implementations, memory 214 stores a subset of the modules and data structures identified above. Furthermore, memory 214 may store additional modules and data structures not described above.

Figure 3:
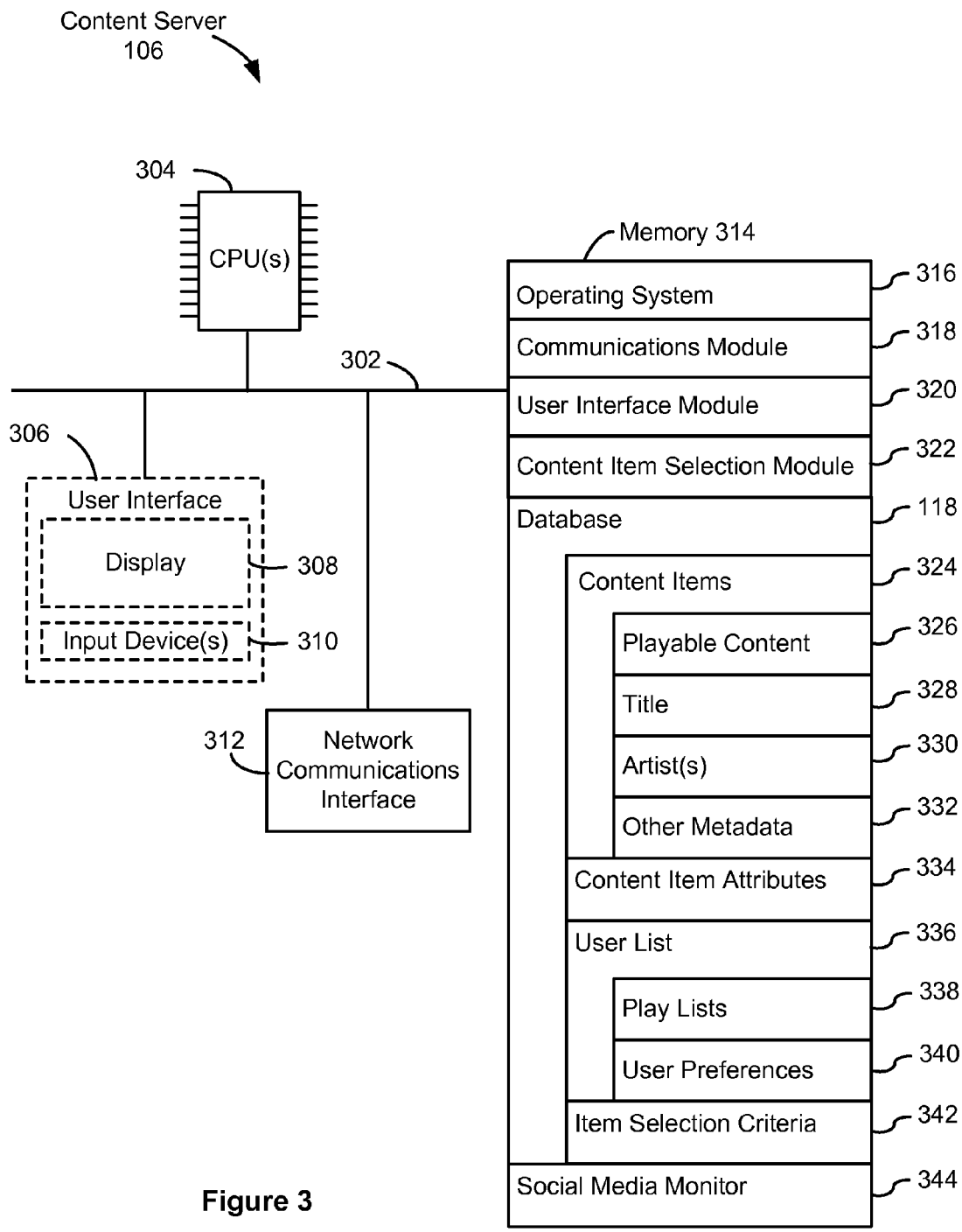
FIG. 3 is a block diagram illustrating a content server in accordance with some implementations.

FIG. 3 is a block diagram illustrating a content server 106 according to some implementations. The content server 106 typically includes one or more processing units (CPUs, sometimes called processors) 304 for executing programs (e.g., programs stored in memory 314), one or more network or other communications interfaces 312, an optional user interface 306, memory 314, and one or more communication buses 302 for interconnecting these components. The communication buses 302 may include circuitry (sometimes called a chipset) that interconnects and controls communications between system components. In some implementations, the user interface 306 includes a display 308 and input device(s) 310 (e.g., keyboard, mouse, touchscreen, keypads, etc.).

Memory 314 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 314 optionally includes one or more storage devices remotely located from the CPU(s) 304. Memory 314, or alternately the non-volatile memory devices(s) within memory 314, comprises a non-transitory computer readable storage medium. In some implementations, memory 314 or the computer readable storage medium of memory 314 stores the following programs, modules, and data structures, or a subset thereof:
- an operating system 316, which includes procedures for handling various basic system services and for performing hardware dependent tasks;
- a communications module 318, which connects the content server 106 to other computers (e.g., the client device 102, the web server 104, etc.) via the one or more communication interfaces 312 (wired or wireless) and one or more communication networks 108, such as the Internet, other wide area networks, local area networks, metropolitan area networks, and so on;

an optional user interface module 320, which receives commands via the input device(s) 310 and generates user interface objects in the display device 308;

a content item selection module 322, which selects content items 324 for individual user and/or for Internet radio stations based on one or more criteria;

a database 118, which stores content items 324 and other data used by the content item selection module 322 and other modules running on the content server 106. Each content item 324 includes both the playable content 326 (e.g., the actual audio track or video), as well as metadata about the content item 324. The metadata includes the title 328 of the content item 324, the name(s) 330 of the artists or group (e.g., singer, band, actor, movie producer), and other metadata 332. The database also includes a list or table of content item attributes 334, such as genres (e.g., "hip-hop," "jazz," "rock") or themes (e.g., "Christmas" or "Hanukkah"). The database 118 also includes a list of users 336, which are typically registered users. This allows the content server to track the likes and dislikes of the users, and thus present users with content items 324 that better match a user's likes. In some implementations, the database stores playlists 338 for each user, which are lists of content items 324. A playlist may be completely constructed by the user, or partially constructed by a user and filled in by the content item selection module 322 (e.g., by identifying items similar to or correlated with content items already in the playlist). An individual user may have zero or more playlists. Some implementations store user preferences 340 provided by each user. When provided, user preferences may enable the content item selection module 322 to provide better content item selections. The database also stored item selection criteria 342. In some implementations, the criteria are stored for each individual user separately. Some implementations enable multiple sets of selection criteria for an individual user (e.g., for a user who likes to listen to both jazz and classical music, but at different times). Some implementations support group selection criteria, which can be used independently or in conjunction with personal item selection criteria; and a social media monitor 344, which can review social media postings to identify information about media content items. This is illustrated in more detail below with respect to FIG. 5.

In some implementations, content items 324 are audio tracks, videos, images, interactive games, three-dimensional environments, or animations.

In some implementations, the programs or modules identified above correspond to sets instructions for performing a function or method described above, including those described above. The sets of instructions can be executed by one or more processors (e.g., the CPUs 304). The above identified modules or programs (i.e., sets of instructions) need not be implemented as separate software programs, procedures, or modules, and thus various subsets of these programs or modules may be combined or otherwise rearranged in various implementations. In some implementations, memory 314 stores a subset of the modules and data structures identified above. Furthermore, memory 314 may store additional modules and data structures not described above.

Although FIGS. 2 and 3 show client and server computers, these figures are intended more as functional descriptions of the various features that may be present in these computers than as structural schematics of the implementations described herein. In practice, and as recognized by those of ordinary skill in the art, items shown separately could be combined and some items could be separated. For example, some items shown separately in FIGS. 2 and 3 could be implemented in single modules or data structures.

Figure 4:
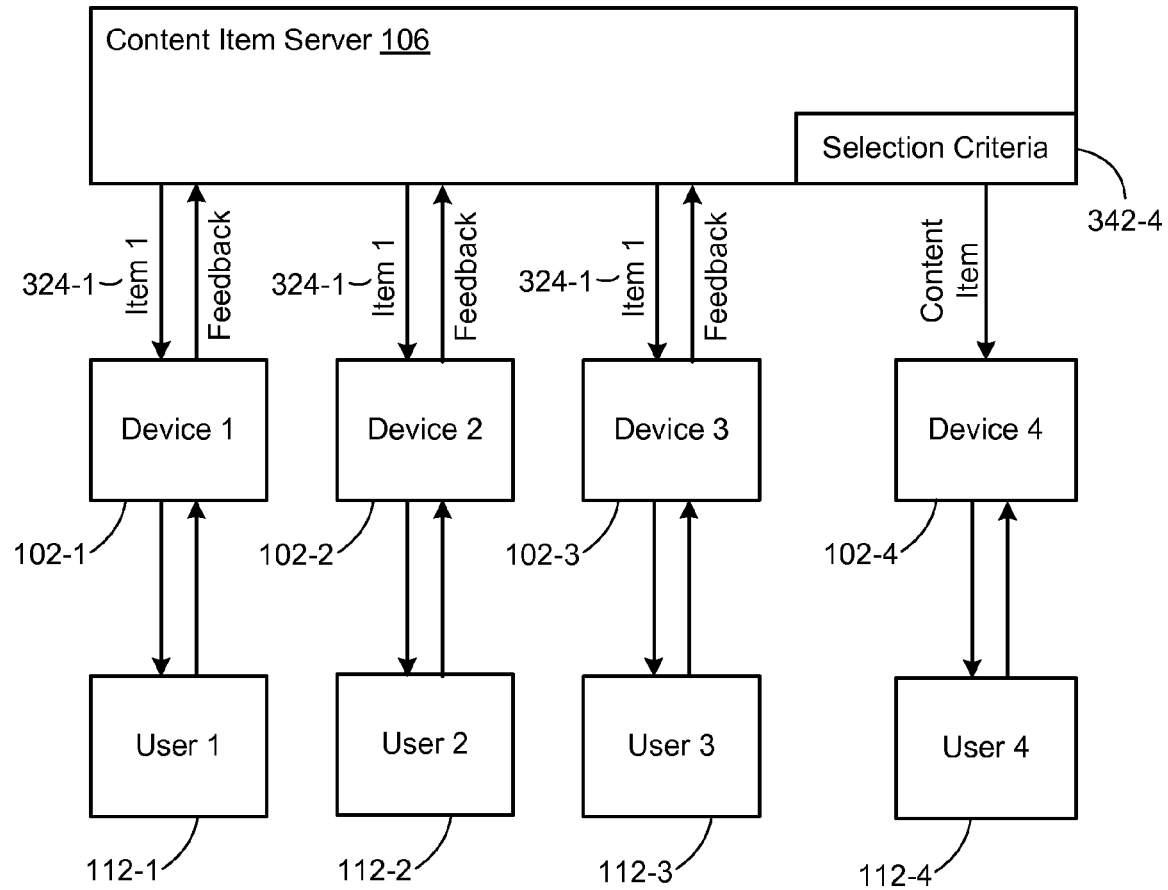
FIG. 4 illustrate a process of adjusting content item selection criteria for one user based on feedback from other users in accordance with some implementations.

FIG. 4 illustrates a process of adjusting selection criteria 342-4 for one user based on feedback for content items from one or more other users. In this illustration, the content item server 106 has provided the same content item 324-1 to each of three devices 102-1, 102-2, and 102-3 used use user 112-1, 112-2, and 112-3. One or more of these users 112 provides some form of feedback to the content item server 106. The feedback can be in various forms. In some cases, the feedback is an explicit positive or negative preference for the specific item 324-1. In some case, the feedback is a "skip-forward" action, which means the user did not want to listen or watch the entire content item 324-1. The feedback from these users adjusts the selection criteria not only for themselves, but also the selection criteria 342-4 for User 4 112-4. The adjustment depends not only on the feedback, but other factors as well, including: any known correlation (or inverse correlation) between the likes of User 4 112-4 and the likes of the other users; any correlation between the content item 324-1 and any other content items; the consistency of the feedback from the users; and so on. For example, a user may search for and listen to song A, then follow up by searching for and listening to song B. Even if songs A and B are completely different, the temporal connection by a single user indicates some sort of correlation, which may apply to other users as well. When User 4 112-4 requests a content item (either an individual content item 324 or a sequence of content items 324), the content item server 106 uses the adjusted criteria 342-4 to select the next content item for delivery to Device 4 102-4. The delivered content item may be the same content item 324-1 (or similar item) that was provided to the other users (e.g., if their feedback was positive), or the delivered content item may be something else (e.g., if the feedback was negative).

Figure 5:
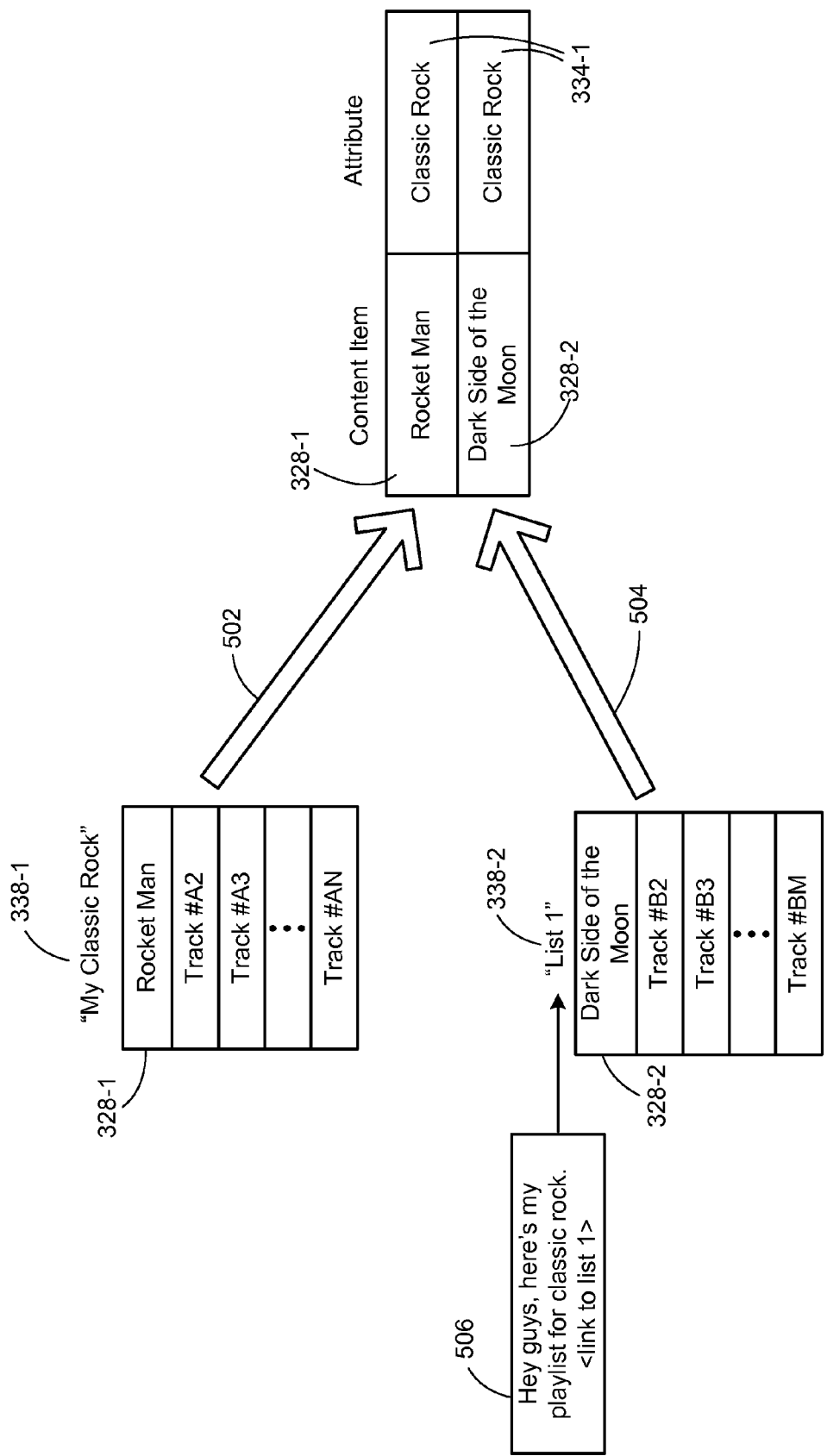
FIG. 5 illustrates processes of associating certain attributes with specific content items based on user playlists in accordance with some implementations.

FIG. 5 illustrates a process of identifying attributes 334 of content items 324 based on playlists 338. In this illustration, one user has created a playlist called "My Classic Rock" 338-1, which includes the title "Rocket Man" 328-1. In some implementations, "Classic Rock" is a content item attribute 334-1, and thus the title of the user's playlist suggests that "Rocket Man" should be classified (502) with the "Classic Rock" 334-1 attribute. Although the opinion of one user may not be significant, if there are a sufficient number of users who make that correlation, the content item selection module 322 can conclude the classification is correct.

Sometimes a playlist has a non-descript title like "List 1" 338-2. Unlike the title "My Classic Rock" 338-1, the title "List 1" 338-2 does not directly provide any useful information. On the other hand, there may be postings to online social media 114 that help associate the content items 324 in a playlist (such as content item 328-2 in playlist 338-2) with relevant attributes. For example, a posting to Twitter® or Facebook® may identify a characteristic of a playlist and provide a link to the list. In social media posting 506, a user refers to his "playlist for classic rock" and provides a link to his list. In this case, the combination of the social media posting 506 with the playlist 338-2 provides the inference (504) that the content item "Dark Side of the Moon" 328-2 should be classified as "Classic Rock." Just like with playlist titles, a correlation by a single user may not be significant, but correlation by enough users increases the likelihood that many other people would agree with the classification. Of course both methods (502 and 504) of correlating a content item with an attribute can be used together to get even greater significance. In some instances, the content item selection module 322 can correlate an attribute with a content item using just playlist titles, but social media postings can increase the certainty of the correlation.

Once a content item is associated with an attribute, the attribute can be used by other users to build playlists 338 or Internet radio stations.

Figure 6A:
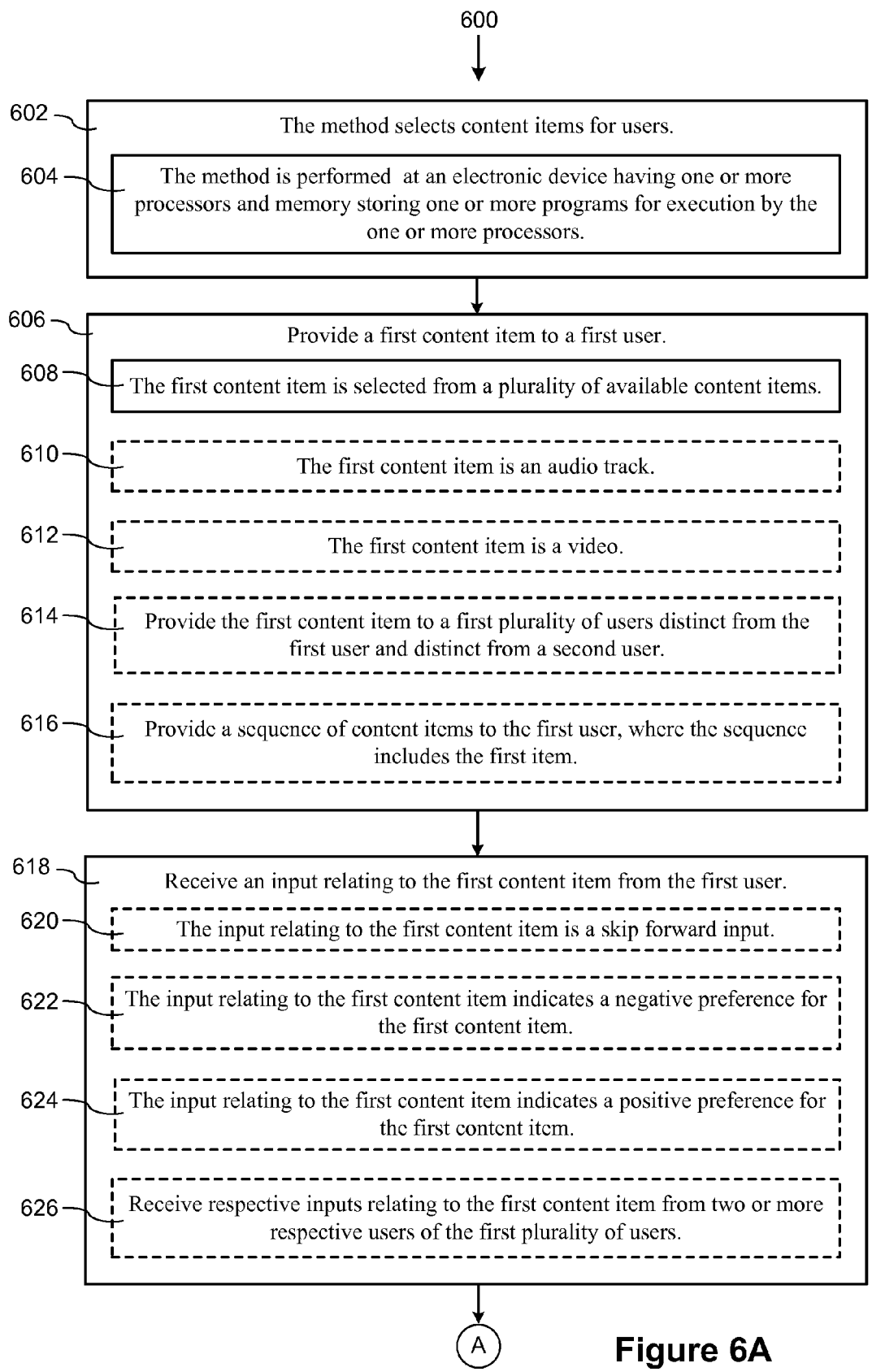
FIGS. 6A and 6B are a flowchart of a method for selecting content items in accordance with some implementations.
Figure 6B:
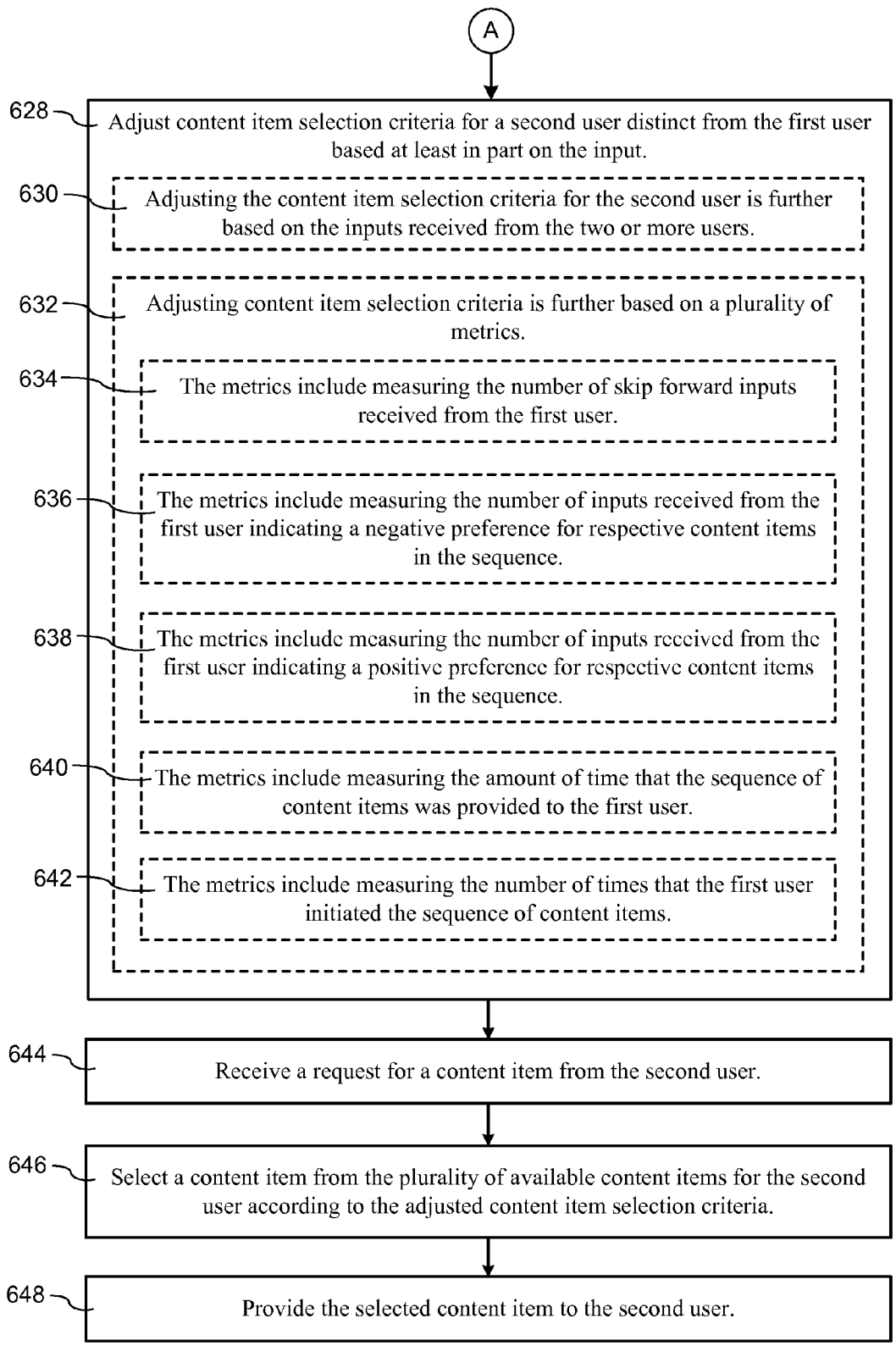

FIGS. 6A and 6B provide a flowchart for a method 600 of selecting (602) content items 324 for users 112. The method is performed (604) by a content item selection module 322 at an electronic device (e.g., content server 106) having one or more processors and memory storing one or more programs for execution by the one or more processors. In some implementations, at least part of the method is performed at a client device 102.

The content item selection module 322 provides (606) a first content item 324-1 to a first user 112-1. In some implementations, proving the first content item 324-1 to the first user 112-1 is in response to a search for content items performed by the first user 112-1. The first content item 324-1 is selected (608) from a plurality of available content items 324. In some implementations, the first content item 324-1 is (610) an audio track. In other implementations, the first content item 324-1 is (612) a video. In some implementations, the content items are still images or sequences of still images, animations, interactive games, or 3-D environments. In some implementations, the first content item 324-1 is provided (614) to a first plurality of users 112, in addition to the first user 112-1. In some implementations, a sequence of content items 324 is provided (616) to the first user 112-1, where the sequence includes the first content item 324-1.

In some cases, the user 112-1 provides some form of feedback about the first content item 324-1. The content item selection module 322 receives (618) the input relating to the first content item 324-1 from the first user 112-1. In some cases, the input relating to the first content item 324-1 is (620) a skip forward input. A user uses skip forward to jump to the end of a content item (e.g., audio track or video), typically when the content item is not desired (at least not at the current time). In some cases, the input relating to the first content item 324-1 is the absence of a skip forward input, which is an implicit positive recognition of the content item 324-1. In some cases, the user interface 206 on the client device 102 provides one or more feedback controls, when enables the first user 112-1 to indicate (622) a negative preference for the first content item 324-1 or indicate (624) a positive preference for the first content item 324-1. Typically, an explicit positive preference has a higher significance than an implicit preference (e.g., lack of skip forward). When the first content item is provided to a plurality of first users, the content item selection module 322 may receive (626) respective inputs relating to the first content item from two or more respective users of the first plurality of users 112. Like the first user 112-1, the two or more respective users may provide feedback in the form of skip forward inputs, indications of positive preference, or indications of negative preference. When a sequence of content items 324 is provided, the feedback can be the length of time spent with the sequence (e.g., listening or watching), or the number of times a user 112 returns to the sequence (e.g., returning to an Internet radio station).

The content item selection module 322 then adjusts the selection criteria 342-1 for the user 112-1 who provided the feedback. In addition, the content item selection module 322 adjusts (628) the item selection criteria 342-4 for a second user 112-4 distinct from the first user. As illustrated in FIG. 4 above, adjusting the content item selection criteria 324-4 for the second user is (630) sometimes based on inputs received from two or more users. Typically, adjusting the content item selection criteria 342-4 is (632) based on a plurality of metrics. In some implementations, the metrics include (634) measuring the number of skip forward inputs received from the first user. In some implementations, the metrics include (636) measuring the number of inputs received from the first user indicating a negative preference for respective content items in the sequence. In some implementations, the metrics include (638) measuring the number of inputs received from the first user indicating a positive preference for respective content items in the sequence. In some implementations, the metrics include (640) measuring the amount of time that the sequence of content items was provided to the first user. In some implementations, the metrics include (642) measuring the number of times that the first user initiated the sequence of content items. Typically, initiating a sequence of content items does not require starting at the same point, or even that the sequence occurs in exactly the same order. For example, this would include returning to the same Internet radio station. The content item selection module 322 can use a single one of these identified metrics, or a plurality, and may include additional metrics.

After the item selection criteria 342-4 for the second user have been adjusted, the second user requests a content item 324 (or sequence of content items 324). The content item selection module 322 receives (644) the request for a content item 324 from the second user 112-4. In response to the request, the content item selection module 322 selects (646) a content item from the plurality of available content items 324 for the second user 112-4 according to the adjusted content item selection criteria 342-4. The content server 106 then provides the selected content item to the second user 112-4. As described above with respect to FIG. 4, the content item selected for the second user 112-4 is not necessarily the same as the first content item 324-1 that was provided to the first user. Indeed, negative feedback from other users could reduce the likelihood of providing the first content item 324-1 to the second user 112-4.

Figure 7A:
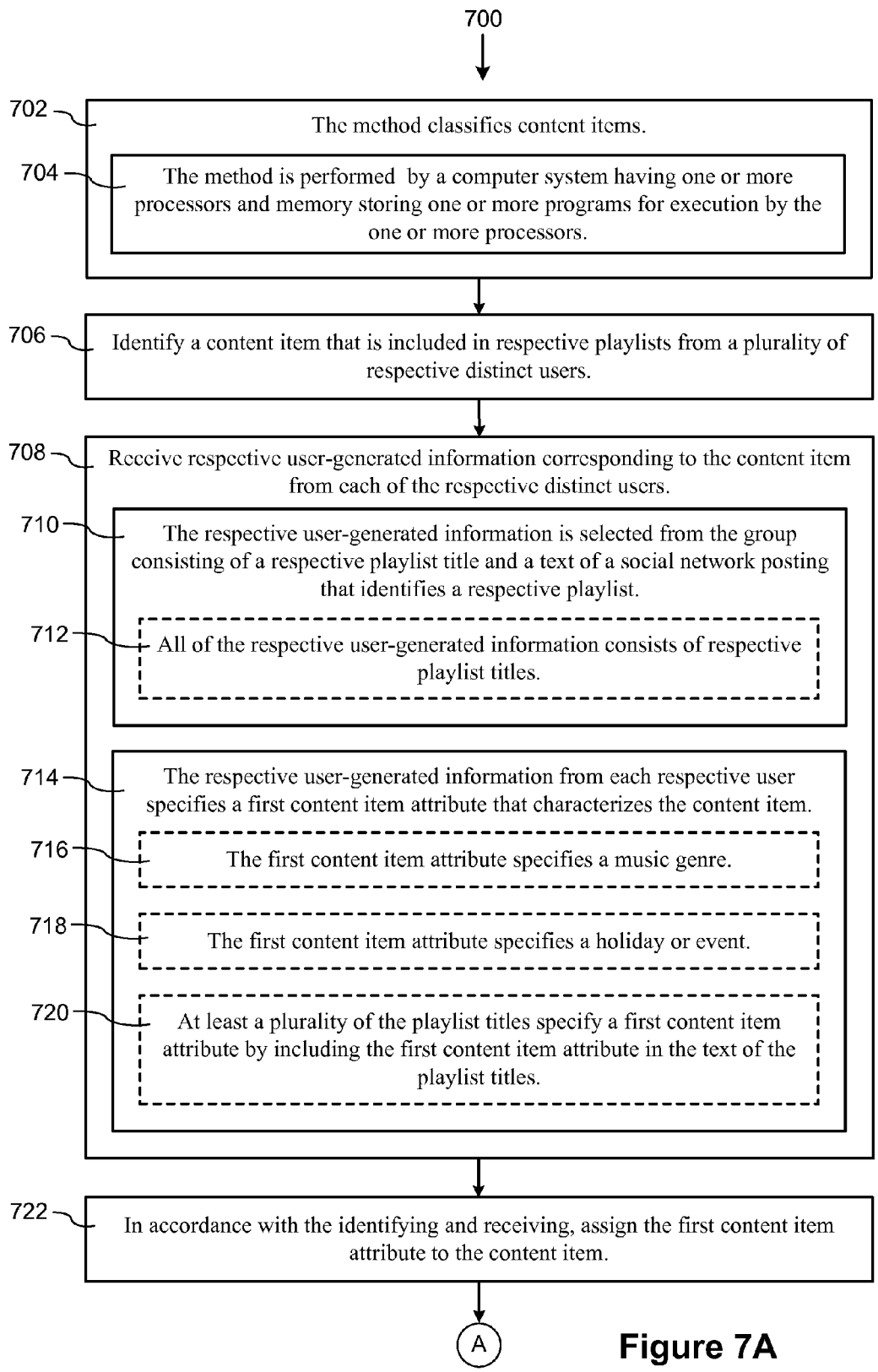
FIGS. 7A and 7B are a flowchart of a method of classifying content items in accordance with some implementations.
Figure 7B:
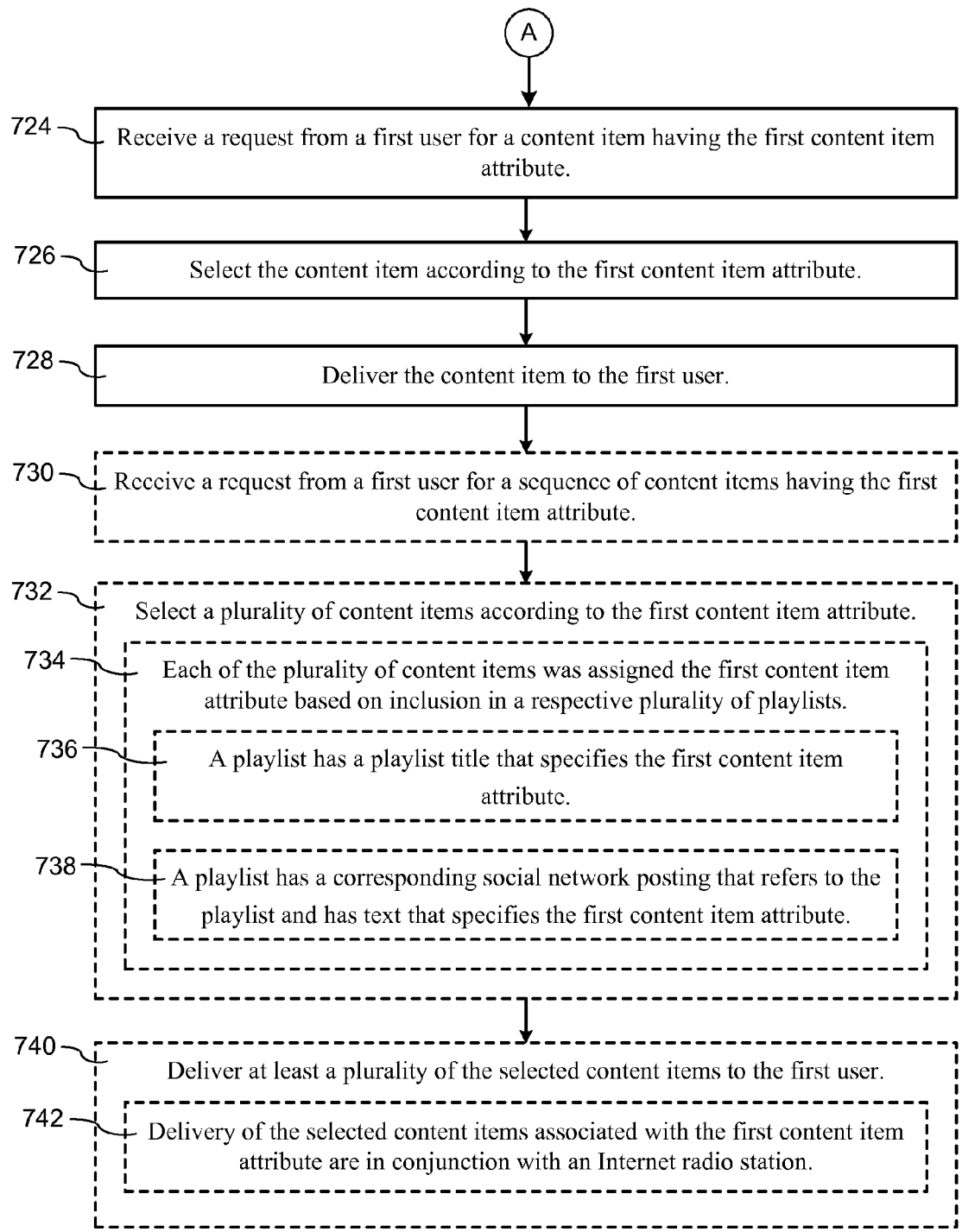

FIGS. 7A and 7B provide a flowchart for a method 700 of classifying (702) content items 324. The method is performed (704) by a content item selection module 322 at an electronic device (e.g., content server 106) having one or more processors and memory storing one or more programs for execution by the one or more processors. In some implementations, at least part of the method is performed at a client device 102.

The content server 106 identifies (706) a content item 324-3 that is included in respective playlists 338 for a plurality of respective distinct users 112. The content server 106 receives (708) respective user-generated information corresponding to the content item 324-3 from each of the respective distinct users. The respective user-generated information is (710) either a respective playlist title or the text of a social network posting that identifies a respective playlist. This was described in more detail with respect to FIG. 5. In some instances, all of the respective user-generated information consists of (712) respective playlist titles. The respective user-generated information from each respective user 112 specifies (714) a first content item attribute 334-3 that characterizes the content item 324-3. In some instances, the first content item attribute 334-3 specifies (716) a music genre. In other instances, the first content item attribute 334-3 specifies (718) a holiday or event, such as Christmas or Hanukkah. In some instances, at least a plurality of the playlist titles specify (720) a first content item attribute 334-3 by including the first content item attribute 334-3 in the text of the playlist titles (e.g., playlist 338-1 in FIG. 5). Based on the content item 324-3 in the playlists 338, and the correlation of the playlists with the first content item attribute 334-3 from the user-generated information, the content server assigns (722) the first content item attribute 334-3 to the first content item 324-3.

Subsequently, the content item selection module 322 receives (724) a request from a first user 112 for a content tem having the first content item attribute. For example, in the context of FIG. 5, a user might want audio tracks that are "Classic Rock" 334-1. In response, the content item selection module 322 selects (726) a content item 324 according to the first content item attribute 334-1. For example, in the context of FIG. 5, the content item selection module 322 may select either "Rocket Man" 328-1 or "Dark Side of the Moon" 328-2. The content server 106 then delivers the content item 324 to the first user.

In some implementations, a user can request a sequence of content items, such as an Internet radio station. In such an implementation, the content item selection module 322 receives (730) the request from a first user for a sequence of content items having the first content item attribute 334-1. In response to such a request, the content item selection module 322 selects (732) a plurality of content items according to the first content item attribute 334-1. In some implementations, each of the plurality of content items selected by the content item selection module 322 was assigned (734) the first content item attribute 334-1 based on inclusion in a respective plurality of playlists 338. Some playlists have (736) a playlist title that specifies the first content item attribute 334-1. Some playlists have (738) a corresponding social network posting that refers to the playlist 338 and has text that specifies the first content item attribute 334-1. The content server 106 then delivers (740) at least a plurality of the selected content items to the first user. In some implementations, delivery of the selected content items associated with the first content item attribute are (742) in conjunction with an Internet radio station.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of classifying content items, performed at a server system having one or more processors and memory storing one or more programs for execution by the one or more processors, the method comprising, for a content item included in playlists from a plurality of distinct users:

receiving, from respective users of the plurality of distinct users, respective user-generated information corresponding to the playlists, wherein the respective user-generated information from each respective user is selected from the group consisting of a respective playlist title that is associated with a respective playlist that includes the content item and a text of a social network posting that identifies a respective playlist that includes the content item;

in accordance with a determination that the respective user-generated information from a threshold number of the plurality of distinct users specifies a first attribute, assigning the first attribute to the content item;

receiving a request, from a first user via an application that is executing on a client device that is distinct from the server system, for content having the first attribute;

in response to receiving the request, selecting the content item according to the first attribute; and delivering the selected content item for playback to the first user via the application.

2. The method of claim 1, further comprising:

receiving a new request from the first user for a sequence of content items having the first attribute;

in response to receiving the new request, selecting a plurality of content items according to the first attribute, wherein each of the plurality of content items was assigned the first attribute based on inclusion in a respective plurality of playlists, wherein each playlist in the respective plurality of playlists has either (a) a playlist title that specifies the first attribute; or (b) a corresponding social network posting that refers to the playlist and has text that specifies the first attribute; and delivering at least a plurality of the selected content items to the first user.

3. The method of claim 2, wherein delivering at least the plurality of the selected content items associated with the first attribute is performed in conjunction with streaming of an Internet radio station to the first user via the application.

4. The method of claim 1, wherein the first attribute specifies a music genre.

5. The method of claim 1, wherein the first attribute specifies a holiday or event.

6. The method of claim 1, wherein all of the respective user-generated information consists of respective playlist titles.

7. The method of claim 1, wherein at least a plurality of the playlist titles specifies the first attribute by including the first attribute in the text of the playlist titles.

8. The method of claim 1, wherein assigning the first attribute to the content item comprises classifying the content item based on the first attribute.

9. The method of claim 1, wherein a text of a social network posting that identifies a first playlist that includes the content item is selected as a first user-generated information in accordance with a determination that a respective playlist title for the first playlist is non-descript.

10. The method of claim 1, wherein the respective user-generated information includes:

a text of a social network posting that identifies a first playlist that includes the content item, the text including the first attribute; and at least a portion of a playlist title for a second playlist that includes the content item, wherein the playlist title for the second playlist includes the first attribute and the second playlist is distinct from the first playlist.

11. A server system, comprising:
one or more processors; and
memory storing one or more programs configured for execution by the one or more processors, the one or more programs comprising instructions for:
for a content item included in playlists from a plurality of distinct users:
receiving, from respective users of the plurality of distinct users, respective user-generated information corresponding to the playlists, wherein the respective user-generated information from each respective user is selected from the group consisting of a respective playlist title that is associated with a respective playlist that includes the content item and a text of a social network posting that identifies a respective playlist that includes the content item;
in accordance with a determination that the respective user-generated information from a threshold number of the plurality of distinct users specifies a first attribute, assigning the first attribute to the content item;
receiving a request, from a first user via an application that is executing on a client device that is distinct from the server system, for content having the first attribute;
in response to receiving the request, selecting the content item according to the first attribute; and
delivering the selected content item for playback to the first user via the application.

12. The server system of claim 11, wherein the one or more programs further comprise instructions for:
receiving a new request from the first user for a sequence of content items having the first attribute;
in response to receiving the new request, selecting a plurality of content items according to the first attribute, wherein each of the plurality of content items was assigned the first attribute based on inclusion in a respective plurality of playlists, wherein each playlist in the respective plurality of playlists has either
(a) a playlist title that specifies the first attribute; or
(b) a corresponding social network posting that refers to the playlist and has text that specifies the first attribute; and
delivering at least a plurality of the selected content items to the first user.

13. The server system of claim 12, wherein delivering at least the plurality of the selected content items associated with the first attribute is in conjunction with streaming of an Internet radio station to the first user via the application.

14. The server system of claim 11, wherein the first attribute specifies a music genre.

15. The server system of claim 11, wherein the first attribute specifies a holiday or event.

16. The server system of claim 11, wherein all of the respective user-generated information consists of respective playlist titles.

17. The server system of claim 11, wherein at least a plurality of the playlist titles specifies the first attribute by including the first attribute in the text of the playlist titles.

18. A non-transitory computer readable storage medium storing one or more programs configured for execution by one or more processors of a server system, the one or more programs comprising instructions for:
for a content item included in playlists from a plurality of distinct users:
receiving, from respective users of the plurality of distinct users, respective user-generated information corresponding to the playlists, wherein the respective user-generated information from each respective user is selected from the group consisting of a respective playlist title that is associated with a respective playlist that includes the content item and a text of a social network posting that identifies a respective playlist that includes the content item;
in accordance with a determination that the respective user-generated information from a threshold number of the plurality of distinct users specifies a first attribute, assigning the first attribute to the content item;
receiving a request, from a first user via an application that is executing on a client device that is distinct from the server system, for content having the first attribute;
in response to receiving the request, selecting the content item according to the first attribute; and
delivering the selected content item for playback to the first user via the application.

19. The non-transitory computer readable storage medium of claim 18, wherein the one or more programs further comprise instructions for:
receiving a new request from the first user for a sequence of content items having the first attribute;
in response to receiving the new request, selecting a plurality of content items according to the first attribute, wherein each of the plurality of content items was assigned the first attribute based on inclusion in a respective plurality of playlists, wherein each playlist in the respective plurality of playlists has either
(a) a playlist title that specifies the first attribute; or
(b) a corresponding social network posting that refers to the playlist and has text that specifies the first attribute; and
delivering at least a plurality of the selected content items to the first user.

20. The non-transitory computer readable storage medium of claim 19, wherein delivering at least the plurality of the selected content items associated with the first attribute is in conjunction with streaming of an Internet radio station to the first user via the application.

21. The non-transitory computer readable storage medium of claim 18, wherein the first attribute specifies a music genre.

22. The non-transitory computer readable storage medium of claim 18, wherein the first attribute specifies a holiday or event.

23. The non-transitory computer readable storage medium of claim 18, wherein all of the respective user-generated information consists of respective playlist titles.

24. The non-transitory computer readable storage medium of claim 18, wherein at least a plurality of the playlist titles specifies the first attribute by including the first attribute in the text of the playlist titles.

* * * * *